United States Patent
Petrie et al.

(10) Patent No.: US 7,399,136 B2
(45) Date of Patent: Jul. 15, 2008

(54) MOLDED BINDER

(75) Inventors: Aidan Petrie, Jamestown, RI (US); Daniel Nelsen, Providence, RI (US); Kenneth Zins, Fitchburg, MA (US)

(73) Assignee: Staples The Office Superstore LLC, Framingham, MA (US)

( * ) Notice: Subject to any disclaimer, the term of this patent is extended or adjusted under 35 U.S.C. 154(b) by 0 days.

(21) Appl. No.: 11/327,194

(22) Filed: Jan. 6, 2006

(65) Prior Publication Data

US 2007/0160417 A1    Jul. 12, 2007

(51) Int. Cl.
*B42F 13/00*    (2006.01)
*B42D 3/00*    (2006.01)

(52) U.S. Cl. .............................. 402/73; 281/29; 281/36; 281/37

(58) Field of Classification Search ................... 402/73, 402/76, 77, 78; 156/196, 210; 264/135; 281/29, 36, 37
See application file for complete search history.

(56) References Cited

U.S. PATENT DOCUMENTS

| 778,910 | A | 1/1905 | Soennecken |
| 842,851 | A | 2/1907 | Boden |
| 854,074 | A | 5/1907 | Bryant |
| 857,377 | A | 6/1907 | Baker |
| 901,549 | A | 10/1908 | Nelson |
| D43,269 | S | 11/1912 | Cronk |
| 1,228,866 | A | 6/1917 | Amoroso |
| 1,398,388 | A | 11/1921 | Murphy |
| 1,887,530 | A * | 11/1932 | Trussell ........................ 402/77 |
| 1,929,614 | A | 10/1933 | Tannehill et al. |
| 2,268,431 | A | 12/1941 | Slonneger |
| 2,494,898 | A | 1/1950 | Rea |
| 2,544,566 | A | 3/1951 | Rose |
| 2,616,431 | A | 11/1952 | Kalwajtys |
| 2,704,546 | A | 3/1955 | Slonneger |

(Continued)

FOREIGN PATENT DOCUMENTS

CA    2198056    10/2000

(Continued)

OTHER PUBLICATIONS

International Search Report and Written Opinion from corresponding International Application No. PCT/US2007/000249, mailed Jun. 27, 2007.

*Primary Examiner*—Willmon Fridie
(74) *Attorney, Agent, or Firm*—Wolf Greenfield & Sacks

(57) ABSTRACT

A binder having molding thereon is provided. The binder may have two panels connected to one another by a hinge and a binding mechanism connected to one of the panels and designed to receive an article, such as one or more sheets of loose-leaf paper and other such articles. Molding may be located on the hinges to reinforce the hinge and may be less hard than the panel material. Molding may be located along the entire length of the hinge or in discrete sections spaced from one another along the hinge. Molding may also be located on edges of the cover panels, such as along the entire edge or at the corners between the edges. The material of the molding may be a different material than the material of the panels. To form the molding on or with the panels, techniques such as comolding or overmolding may be employed.

49 Claims, 9 Drawing Sheets

U.S. PATENT DOCUMENTS

| | | |
|---|---|---|
| 2,715,906 A | 8/1955 | Lucchesi |
| 2,894,513 A | 7/1959 | Gempe et al. |
| 3,083,713 A | 4/1963 | Meürer |
| 3,572,957 A | 3/1971 | Strassberg |
| 3,582,224 A | 6/1971 | Schade |
| 3,589,049 A | 6/1971 | Cornelius |
| 3,591,300 A | 7/1971 | Beyer |
| 3,595,554 A | 7/1971 | Donovan |
| 3,599,294 A | 8/1971 | Lawes |
| 3,612,709 A | 10/1971 | Miyamoto |
| 3,638,967 A | 2/1972 | Mullins |
| 3,647,306 A | 3/1972 | Chamberlin |
| 3,659,357 A | 5/1972 | Martinesco et al. |
| 3,663,041 A | 5/1972 | White |
| 3,682,433 A | 8/1972 | Petersen |
| 3,686,780 A | 8/1972 | Sheehan |
| 3,706,502 A | 12/1972 | La Fleur |
| 3,717,416 A | 2/1973 | Schade |
| 3,718,402 A | 2/1973 | Schade |
| 3,724,876 A | 4/1973 | Krikorian |
| 3,734,634 A | 5/1973 | Fenston |
| 3,746,457 A | 7/1973 | Comenitz |
| 3,748,051 A | 7/1973 | Frank |
| 3,763,582 A | 10/1973 | Stevens et al. |
| 3,766,626 A | 10/1973 | Mjos et al. |
| 3,771,890 A | 11/1973 | Notto |
| 3,776,648 A | 12/1973 | Price |
| 3,784,021 A | 1/1974 | Mark |
| 3,807,883 A | 4/1974 | Karlsson |
| 3,809,485 A | 5/1974 | Beyer |
| 3,811,212 A | 5/1974 | Wright |
| 3,814,527 A | 6/1974 | Lawes |
| 3,826,362 A | 7/1974 | Staskus |
| 3,826,582 A | 7/1974 | Podosek |
| 3,827,111 A | 8/1974 | O'Connell |
| 3,834,824 A | 9/1974 | Jahn |
| 3,837,680 A | 9/1974 | Cimini |
| 3,857,492 A | 12/1974 | Michaelis et al. |
| 3,884,586 A | 5/1975 | Michaelis et al. |
| 3,910,708 A | 10/1975 | Rohner |
| 3,913,740 A | 10/1975 | Bisberg |
| 3,917,067 A | 11/1975 | Brown et al. |
| 3,936,202 A | 2/1976 | Brajituli |
| 3,944,374 A | 3/1976 | Young et al. |
| 3,950,107 A | 4/1976 | Seaborn |
| 3,954,343 A | 5/1976 | Thomsen |
| 3,957,321 A | 5/1976 | Rose |
| 3,958,886 A | 5/1976 | Price |
| 3,982,344 A | 9/1976 | Phillips |
| 3,993,374 A | 11/1976 | Schudy et al. |
| 3,995,961 A | 12/1976 | Dorfman et al. |
| 4,000,951 A | 1/1977 | Agnew et al. |
| 4,008,305 A | 2/1977 | Staats |
| 4,011,018 A | 3/1977 | Doolittle |
| 4,019,823 A | 4/1977 | Kleinert et al. |
| 4,033,652 A | 7/1977 | O'Brien |
| 4,056,326 A | 11/1977 | Crawford |
| 4,060,330 A | 11/1977 | Baccile |
| 4,070,073 A | 1/1978 | Schudy et al. |
| 4,070,736 A | 1/1978 | Land |
| 4,129,396 A | 12/1978 | Stecklow |
| 4,130,368 A | 12/1978 | Jacoby et al. |
| 4,136,981 A | 1/1979 | Stecklow |
| 4,137,650 A | 2/1979 | Hayes |
| 4,138,143 A | 2/1979 | Lawes |
| 4,164,085 A | 8/1979 | Steeb et al. |
| 4,172,332 A | 10/1979 | Holes et al. |
| 4,172,675 A | 10/1979 | Lacourt |
| 4,178,710 A | 12/1979 | Schmid |
| 4,190,374 A | 2/1980 | Lindell |
| 4,192,620 A | 3/1980 | Jahn |
| 4,200,404 A | 4/1980 | Agnew et al. |
| 4,201,492 A | 5/1980 | Almgren |
| 4,202,642 A | 5/1980 | Sjöstedt |
| 4,208,146 A | 6/1980 | Schudy |
| 4,214,839 A | 7/1980 | Sheehan et al. |
| 4,222,679 A | 9/1980 | Luogameno |
| 4,231,174 A | 11/1980 | Thompson |
| 4,239,411 A | 12/1980 | Moliard |
| 4,240,761 A | 12/1980 | Jacobson |
| 4,243,459 A | 1/1981 | Lawes |
| 4,256,411 A | 3/1981 | Podosek |
| 4,264,228 A | 4/1981 | Staats |
| 4,274,906 A | 6/1981 | Clar |
| 4,281,940 A | 8/1981 | Rhee |
| 4,295,747 A | 10/1981 | Errichiello |
| 4,315,696 A | 2/1982 | Ermanski et al. |
| 4,349,289 A | 9/1982 | Cardellini |
| 4,349,290 A | 9/1982 | Cardellini |
| 4,352,582 A | 10/1982 | Eliasson |
| 4,355,916 A | 10/1982 | Cardellini |
| 4,368,995 A | 1/1983 | Cohen |
| 4,373,825 A | 2/1983 | Zabielski |
| 4,378,647 A | 4/1983 | Stancato |
| 4,396,209 A | 8/1983 | Schultz |
| 4,397,904 A | 8/1983 | Hulber et al. |
| 4,405,250 A | 9/1983 | Wu |
| 4,420,112 A | 12/1983 | Cline |
| 4,420,271 A | 12/1983 | Zabielski |
| 4,423,976 A | 1/1984 | Feldmahr et al. |
| 4,435,464 A | 3/1984 | Hulber et al. |
| 4,435,906 A | 3/1984 | Mori |
| 4,441,834 A | 4/1984 | Cardellini |
| 4,445,799 A | 5/1984 | Wright et al. |
| 4,482,417 A | 11/1984 | Hulber et al. |
| 4,483,637 A | 11/1984 | Updegrave et al. |
| 4,484,830 A | 11/1984 | Anderson |
| 4,486,112 A | 12/1984 | Cummins |
| 4,518,275 A | 5/1985 | Rauch, III et al. |
| 4,522,526 A | 6/1985 | Lozfau et al. |
| 4,527,923 A | 7/1985 | Waldman |
| 4,531,764 A | 7/1985 | Chang |
| 4,531,765 A | 7/1985 | Shulman |
| 4,544,123 A | 10/1985 | Peacock |
| 4,552,478 A | 11/1985 | Cohen |
| 4,552,479 A | 11/1985 | Nickow et al. |
| 4,560,299 A | 12/1985 | Podosek |
| 4,566,721 A | 1/1986 | Friedman et al. |
| 4,566,817 A | 1/1986 | Barrett, Jr. |
| 4,571,108 A | 2/1986 | Vogl |
| 4,573,821 A | 3/1986 | Gilreath |
| 4,573,822 A | 3/1986 | Allen |
| 4,576,497 A | 3/1986 | Beleckis |
| 4,577,985 A | 3/1986 | Beyer |
| 4,582,442 A | 4/1986 | Rager |
| 4,583,877 A | 4/1986 | Wilson |
| 4,588,209 A | 5/1986 | Zebrowski et al. |
| 4,588,321 A | 5/1986 | Egly |
| 4,600,346 A | 7/1986 | Podosek |
| 4,614,450 A | 9/1986 | Neiman |
| 4,629,349 A | 12/1986 | Pitts |
| 4,630,843 A | 12/1986 | Willat |
| 4,639,157 A | 1/1987 | Herzfeld |
| 4,640,413 A | 2/1987 | Kaplan et al. |
| 4,640,451 A | 2/1987 | Steiner et al. |
| 4,681,472 A | 7/1987 | Ruble |
| 4,681,474 A | 7/1987 | Wiberg |
| 4,690,580 A | 9/1987 | Kissel |
| 4,696,595 A | 9/1987 | Pinkney |
| 4,704,042 A | 11/1987 | Eisen et al. |
| 4,708,509 A | 11/1987 | Brunett |
| 4,710,084 A | 12/1987 | Ludvigsen |
| 4,722,628 A | 2/1988 | Rager |
| 4,729,688 A | 3/1988 | Manz |

| | | | | | |
|---|---|---|---|---|---|
| 4,733,985 A | 3/1988 | Moosmüuller | 5,213,368 A | 5/1993 | Wyant |
| 4,743,134 A | 5/1988 | Reinherz et al. | 5,213,429 A | 5/1993 | Johnson |
| 4,749,297 A | 6/1988 | Roy | 5,219,239 A | 6/1993 | Bianco |
| 4,750,884 A | 6/1988 | Bourgeois et al. | 5,219,437 A | 6/1993 | Moor et al. |
| 4,792,253 A | 12/1988 | Jacobson | 5,222,690 A | 6/1993 | Jeffords |
| 4,795,194 A | 1/1989 | Etheredge | 5,222,825 A | 6/1993 | Wyant |
| 4,795,287 A | 1/1989 | Friedman | 5,234,276 A | 8/1993 | Semerjian et al. |
| 4,798,491 A | 1/1989 | Lässle | 5,240,340 A | 8/1993 | Lynch et al. |
| 4,813,803 A | 3/1989 | Gross | D340,068 S | 10/1993 | Chan |
| 4,815,882 A | 3/1989 | Ohminato | 5,251,935 A | 10/1993 | Bottigliéri |
| 4,820,071 A | 4/1989 | Steinfield et al. | 5,255,991 A | 10/1993 | Sparkes |
| 4,828,421 A | 5/1989 | Arakaki | 5,261,701 A | 11/1993 | Walters |
| 4,830,404 A | 5/1989 | Lu | 5,265,359 A | 11/1993 | Glazer et al. |
| 4,831,756 A | 5/1989 | Huang et al. | 5,269,616 A | 12/1993 | O'Neill |
| 4,832,369 A | 5/1989 | Johnson et al. | D343,646 S | 1/1994 | Semerjian et al. |
| 4,835,756 A | 5/1989 | Kaku et al. | 5,281,040 A | 1/1994 | Hodkin et al. |
| 4,838,724 A | 6/1989 | Spence, Jr. | 5,286,128 A | 2/1994 | Gillum |
| 4,848,798 A * | 7/1989 | Moor ................. 281/31 | 5,299,879 A | 4/1994 | Burrow |
| 4,852,909 A | 8/1989 | Stoyanoff | 5,323,553 A | 6/1994 | Candido |
| 4,854,763 A | 8/1989 | Jonsson | 5,330,279 A | 7/1994 | Ruble |
| 4,856,817 A * | 8/1989 | Moor ................. 281/29 | 5,330,281 A | 7/1994 | Kalan |
| 4,872,920 A | 10/1989 | Flynn et al. | 5,332,327 A | 7/1994 | Gillum |
| 4,880,327 A | 11/1989 | Sanabria | D349,514 S | 8/1994 | Gotlund |
| 4,886,299 A | 12/1989 | Ducorday | 5,333,962 A | 8/1994 | Johnson |
| 4,886,390 A | 12/1989 | Silence et al. | 5,340,155 A | 8/1994 | Podosek |
| 4,890,728 A | 1/1990 | Grimsley | 5,340,229 A | 8/1994 | Schwartzman |
| 4,892,333 A | 1/1990 | Krulich | D350,983 S | 9/1994 | Penniman |
| 4,896,900 A | 1/1990 | Hong | 5,348,412 A | 9/1994 | Fuller |
| 4,904,103 A | 2/1990 | Im | 5,356,155 A | 10/1994 | Gross |
| 4,916,838 A | 4/1990 | Holson | 5,358,125 A | 10/1994 | Blessing |
| 4,919,557 A | 4/1990 | Podosek | 5,368,333 A | 11/1994 | Arroyo |
| 4,925,145 A | 5/1990 | Hegarty | 5,368,407 A | 11/1994 | Law |
| 4,925,328 A | 5/1990 | Jefferies | 5,378,073 A | 1/1995 | Law |
| 4,934,739 A | 6/1990 | Stancato | 5,379,979 A | 1/1995 | Due |
| 4,943,177 A | 7/1990 | Jordan et al. | 5,383,568 A | 1/1995 | Tusick et al. |
| 4,962,951 A | 10/1990 | Mechesney | 5,393,154 A | 2/1995 | Hubbell |
| 4,990,017 A | 2/1991 | Rotherham | 5,393,155 A | 2/1995 | Ng |
| 4,991,767 A | 2/1991 | Wyant | D356,337 S | 3/1995 | Douglas |
| 4,997,206 A | 3/1991 | Hong | 5,394,638 A | 3/1995 | Raymond et al. |
| 4,998,840 A | 3/1991 | Ruble | 5,395,137 A | 3/1995 | Kim |
| 5,002,311 A | 3/1991 | Brunjes | 5,411,293 A | 5/1995 | Monzyk |
| 5,015,011 A | 5/1991 | York | 5,413,215 A | 5/1995 | Hardinger, Jr. |
| 5,020,828 A | 6/1991 | Moor | 5,417,509 A | 5/1995 | Schwartz |
| 5,028,159 A | 7/1991 | Amrich et al. | 5,423,624 A | 6/1995 | Richards |
| 5,030,027 A | 7/1991 | Bachrach et al. | 5,429,445 A | 7/1995 | Un-tae |
| 5,033,899 A | 7/1991 | Pitts et al. | 5,430,535 A | 7/1995 | Acquaviva |
| 5,035,526 A | 7/1991 | Cooper et al. | 5,431,449 A | 7/1995 | Arimoto et al. |
| 5,056,825 A | 10/1991 | Templet | 5,437,514 A | 8/1995 | Minch |
| 5,059,052 A | 10/1991 | Casper | 5,441,229 A | 8/1995 | Spagnoli |
| 5,067,840 A | 11/1991 | Cooper et al. | 5,441,357 A | 8/1995 | Wilson |
| 5,069,568 A | 12/1991 | Acker | 5,445,251 A | 8/1995 | Redwood |
| 5,076,722 A | 12/1991 | Rohner | 5,445,417 A | 8/1995 | Bromer et al. |
| 5,090,732 A | 2/1992 | Kuhns et al. | 5,449,202 A | 9/1995 | Nalepka et al. |
| 5,100,253 A | 3/1992 | Cooper | D365,361 S | 12/1995 | Smith et al. |
| 5,106,222 A | 4/1992 | D'Amore | 5,476,335 A | 12/1995 | Whaley |
| D325,928 S | 5/1992 | Bourgeois | 5,490,440 A | 2/1996 | Karlis et al. |
| 5,114,009 A | 5/1992 | Johnston | 5,490,739 A | 2/1996 | Olson |
| 5,114,259 A | 5/1992 | Meservy et al. | 5,503,052 A | 4/1996 | Rigney et al. |
| 5,116,081 A | 5/1992 | Mann, Jr. | 5,503,487 A | 4/1996 | Ong |
| 5,116,157 A | 5/1992 | Gillum et al. | 5,503,489 A | 4/1996 | Maudal |
| 5,118,137 A | 6/1992 | Walters | 5,503,518 A | 4/1996 | Scholz |
| 5,118,213 A | 6/1992 | Meservy et al. | 5,509,746 A | 4/1996 | Ho |
| 5,120,149 A | 6/1992 | Smith | 5,522,508 A | 6/1996 | Pesola |
| 5,135,323 A | 8/1992 | Pinheiro | 5,562,309 A | 10/1996 | Brink et al. |
| 5,154,527 A | 10/1992 | Blessing | 5,564,623 A | 10/1996 | Kiley |
| 5,158,386 A | 10/1992 | Mann, Jr. | 5,577,852 A | 11/1996 | To |
| 5,160,001 A | 11/1992 | Marceau | 5,597,256 A | 1/1997 | Burton et al. |
| 5,160,208 A | 11/1992 | Lockhart | 5,605,354 A | 2/1997 | Kwon |
| 5,163,768 A | 11/1992 | Salisbury et al. | 5,607,246 A | 3/1997 | Podosek |
| 5,180,247 A | 1/1993 | Yu | 5,611,633 A | 3/1997 | Whaley |
| 5,186,565 A | 2/1993 | Jack | 5,618,061 A | 4/1997 | Ritterling |
| 5,190,127 A | 3/1993 | Cummings | 5,618,122 A | 4/1997 | Constantine |
| 5,199,809 A | 4/1993 | Semerjian | 5,620,207 A | 4/1997 | Podosek et al. |

| | | | | | |
|---|---|---|---|---|---|
| 5,620,271 A | 4/1997 | Bergh et al. | 5,916,280 A | 6/1999 | Lantz |
| 5,622,386 A | 4/1997 | Young | 5,924,811 A | 7/1999 | To et al. |
| 5,626,367 A | 5/1997 | Lu | D412,530 S | 8/1999 | Bould |
| 5,632,113 A | 5/1997 | Raymond et al. | 5,931,506 A | 8/1999 | Lo |
| 5,642,954 A | 7/1997 | Hudspith | 5,938,241 A | 8/1999 | Wilson |
| 5,649,799 A | 7/1997 | Constantine et al. | 5,944,352 A | 8/1999 | Crouch et al. |
| 5,651,628 A | 7/1997 | Bankes et al. | D413,923 S | 9/1999 | Brown et al. |
| 5,660,514 A | 8/1997 | Wilson | D413,924 S | 9/1999 | Bould |
| 5,667,323 A | 9/1997 | Whaley | 5,947,524 A | 9/1999 | Podosek |
| 5,667,324 A | 9/1997 | Aoki | 5,951,189 A | 9/1999 | Winzen |
| 5,669,635 A | 9/1997 | Wilson et al. | 5,957,611 A | 9/1999 | Whaley |
| 5,669,689 A | 9/1997 | Zeifang | D414,801 S | 10/1999 | Karten et al. |
| 5,671,950 A | 9/1997 | Hanson | 5,964,544 A | 10/1999 | Ko |
| 5,673,604 A | 10/1997 | Rigney | 5,967,690 A | 10/1999 | Tibbetts |
| 5,674,021 A | 10/1997 | Hutnick | 5,971,649 A | 10/1999 | To |
| D386,786 S | 11/1997 | Henderson | 5,975,785 A | 11/1999 | Chan |
| 5,683,111 A | 11/1997 | Bass et al. | 5,980,146 A | 11/1999 | To |
| 5,683,218 A | 11/1997 | Mori | 5,988,969 A | 11/1999 | Maes |
| 5,690,310 A | 11/1997 | Brown | D417,697 S | 12/1999 | Long et al. |
| 5,692,848 A | 12/1997 | Wada | D417,890 S | 12/1999 | Joe et al. |
| 5,695,295 A | 12/1997 | Ayele et al. | 6,004,060 A | 12/1999 | Bedol |
| 5,697,646 A | 12/1997 | Venegas | 6,007,103 A | 12/1999 | Tomasello |
| 5,697,722 A | 12/1997 | Hladik et al. | 6,007,266 A | 12/1999 | Cheng et al. |
| D389,183 S | 1/1998 | Chan | 6,010,270 A | 1/2000 | Friedman |
| 5,709,495 A | 1/1998 | Brunner | 6,012,866 A | 1/2000 | Podosek |
| 5,711,627 A | 1/1998 | Chapman | 6,017,164 A | 1/2000 | Abbott |
| 5,713,683 A | 2/1998 | Bergh et al. | 6,024,508 A | 2/2000 | Lippeth et al. |
| 5,716,153 A | 2/1998 | Aiello | 6,030,139 A | 2/2000 | Ray |
| 5,718,529 A | 2/1998 | Chan | 6,030,140 A | 2/2000 | Karten et al. |
| 5,720,564 A | 2/1998 | Winzen | 6,030,149 A | 2/2000 | Foo et al. |
| 5,727,894 A | 3/1998 | Covey | D421,460 S | 3/2000 | Joe et al. |
| 5,755,513 A | 5/1998 | To | 6,032,987 A | 3/2000 | Fukumoto et al. |
| 5,755,525 A | 5/1998 | Chan | 6,033,144 A | 3/2000 | Ng et al. |
| 5,762,375 A | 6/1998 | Kogutt et al. | 6,036,394 A | 3/2000 | Cheng |
| 5,772,348 A | 6/1998 | To | 6,039,495 A | 3/2000 | Zimmerman et al. |
| 5,785,445 A | 7/1998 | Podosek et al. | D423,044 S | 4/2000 | Burke et al. |
| D397,146 S | 8/1998 | Chan | 6,045,161 A | 4/2000 | Ashcraft et al. |
| 5,788,390 A | 8/1998 | Law | 6,045,286 A | 4/2000 | Tung |
| 5,788,391 A | 8/1998 | Cheung | 6,045,880 A | 4/2000 | Minichiello |
| 5,788,392 A | 8/1998 | Cheung | 6,047,990 A | 4/2000 | Mogelonsky et al. |
| 5,806,893 A | 9/1998 | Wilson et al. | 6,062,760 A | 5/2000 | Whaley |
| 5,807,006 A | 9/1998 | Cheung | 6,068,423 A | 5/2000 | Owen |
| 5,810,499 A | 9/1998 | Law | 6,074,151 A | 6/2000 | Pas |
| 5,810,500 A | 9/1998 | Whaley | 6,082,771 A | 7/2000 | Long et al. |
| 5,816,729 A | 10/1998 | Whaley | 6,086,105 A | 7/2000 | Woldenberg et al. |
| 5,826,851 A | 10/1998 | Arbisi | 6,086,106 A | 7/2000 | Joe et al. |
| 5,827,004 A | 10/1998 | Kim | 6,086,281 A | 7/2000 | Covey |
| 5,836,507 A | 11/1998 | Mueller et al. | 6,095,564 A | 8/2000 | Wien |
| 5,836,709 A | 11/1998 | Cheung | 6,106,018 A | 8/2000 | McKeown et al. |
| 5,842,807 A | 12/1998 | To | 6,109,812 A | 8/2000 | Welch |
| 5,846,013 A | 12/1998 | To | 6,109,813 A | 8/2000 | To et al. |
| 5,853,259 A | 12/1998 | Murray, Jr. | 6,116,804 A | 9/2000 | Mehta |
| 5,857,797 A | 1/1999 | Streff et al. | 6,117,264 A | 9/2000 | Brewster |
| D405,825 S | 2/1999 | Karten | 6,126,353 A | 10/2000 | Mullin et al. |
| 5,864,934 A | 2/1999 | Young | 6,146,728 A | 11/2000 | Bay |
| 5,868,513 A | 2/1999 | Law | 6,149,205 A | 11/2000 | Attia et al. |
| D406,602 S | 3/1999 | Karten | D435,269 S | 12/2000 | Karten et al. |
| D406,603 S | 3/1999 | Karten | 6,155,737 A | 12/2000 | Whaley |
| D407,434 S | 3/1999 | Moor | 6,161,979 A | 12/2000 | Yamamoto et al. |
| 5,876,143 A | 3/1999 | Ong | D436,994 S | 1/2001 | Whaley |
| 5,876,144 A | 3/1999 | Bedol et al. | 6,168,338 B1 | 1/2001 | Young |
| 5,879,097 A | 3/1999 | Cheng | 6,168,339 B1 | 1/2001 | To |
| 5,882,038 A | 3/1999 | Ong | 6,168,340 B1 | 1/2001 | Lehmann et al. |
| 5,882,135 A | 3/1999 | Ko | 6,174,100 B1 | 1/2001 | Song |
| 5,888,011 A | 3/1999 | Reinbold, Jr. | 6,179,507 B1 | 1/2001 | Lam |
| 5,891,007 A | 4/1999 | Bay | 6,179,508 B1 | 1/2001 | Coerver |
| 5,891,568 A | 4/1999 | Hartzog et al. .............. 428/369 | 6,186,690 B1 | 2/2001 | Duncan |
| 5,897,141 A | 4/1999 | Dugmore et al. | 6,196,749 B1 | 3/2001 | Chizmar |
| D409,385 S | 5/1999 | Pearson et al. | 6,200,058 B1 | 3/2001 | Maudal |
| 5,901,982 A | 5/1999 | Cooper | 6,203,229 B1 | 3/2001 | Coerver |
| 5,903,958 A | 5/1999 | Whaley | 6,205,693 B1 | 3/2001 | Pliler et al. |
| 5,904,435 A | 5/1999 | Tung | 6,206,601 B1 | 3/2001 | Ko |
| 5,911,441 A | 6/1999 | Yamamoto et al. | 6,206,602 B1 | 3/2001 | Yamamoto et al. |

| Patent Number | Date | Name |
|---|---|---|
| 6,213,668 B1 * | 4/2001 | Brown et al. .................. 402/26 |
| 6,213,669 B1 | 4/2001 | Yamamoto |
| 6,213,670 B1 | 4/2001 | Wien |
| 6,217,247 B1 | 4/2001 | Ng |
| 6,227,746 B1 | 5/2001 | Long et al. |
| 6,234,701 B1 * | 5/2001 | Karten et al. .................. 402/73 |
| 6,241,414 B1 | 6/2001 | Wien |
| 6,250,834 B1 | 6/2001 | Wien |
| 6,261,021 B1 | 7/2001 | Pfanner et al. |
| 6,270,279 B1 | 8/2001 | Whaley |
| 6,273,630 B1 | 8/2001 | Sgro et al. |
| 6,276,862 B1 | 8/2001 | Snyder et al. |
| 6,280,114 B1 | 8/2001 | To |
| 6,290,421 B1 | 9/2001 | Welch |
| 6,293,722 B1 | 9/2001 | Holbrook et al. |
| 6,296,727 B1 | 10/2001 | Chang et al. |
| 6,302,443 B1 | 10/2001 | Ashcraft et al. |
| 6,305,714 B1 | 10/2001 | Rossetto et al. |
| 6,332,630 B1 | 12/2001 | Wolff et al. |
| 6,345,924 B1 | 2/2002 | Whaley |
| 6,357,952 B1 | 3/2002 | McKeown |
| 6,358,587 B1 | 3/2002 | Saint et al. |
| 6,361,236 B1 | 3/2002 | Podosek |
| 6,361,639 B1 | 3/2002 | Owen et al. |
| 6,364,558 B1 | 4/2002 | To |
| 6,364,559 B2 | 4/2002 | Brown et al. |
| 6,367,842 B1 | 4/2002 | Wien et al. |
| 6,368,005 B1 | 4/2002 | Streff et al. |
| 6,371,679 B1 | 4/2002 | Peleman |
| 6,375,604 B1 | 4/2002 | Verhines |
| 6,379,156 B1 | 4/2002 | Laravea et al. |
| 6,394,684 B2 | 5/2002 | Kapur et al. |
| D459,392 S | 6/2002 | Xu |
| 6,409,409 B2 | 6/2002 | Bauman et al. |
| D460,109 S | 7/2002 | To |
| 6,439,093 B1 | 8/2002 | Davies |
| 6,450,399 B1 | 9/2002 | Attia et al. |
| 6,453,592 B1 | 9/2002 | Pliler et al. |
| 6,467,984 B1 | 10/2002 | To |
| 6,471,438 B2 | 10/2002 | Faris |
| 6,474,897 B1 | 11/2002 | To |
| 6,481,572 B2 | 11/2002 | Wien et al. |
| 6,488,433 B2 | 12/2002 | Wien et al. |
| 6,518,566 B1 | 2/2003 | Brown |
| 6,520,514 B2 | 2/2003 | Clegg |
| 6,527,465 B1 | 3/2003 | Welch |
| 6,533,486 B1 | 3/2003 | To |
| 6,550,812 B1 | 4/2003 | Castillo et al. |
| 6,557,897 B1 | 5/2003 | Gaudet |
| 6,558,064 B1 | 5/2003 | Tibbetts |
| D476,682 S | 7/2003 | Berry et al. |
| D478,349 S | 8/2003 | Capaci |
| 6,607,216 B1 | 8/2003 | Stenger et al. |
| 6,632,042 B1 | 10/2003 | Liener Chin et al. |
| 6,637,968 B2 | 10/2003 | Ko |
| 6,644,882 B2 | 11/2003 | Brown et al. |
| 6,652,178 B2 | 11/2003 | Walton |
| 6,682,247 B1 | 1/2004 | Castillo et al. |
| 6,702,501 B2 | 3/2004 | Chizmar |
| 6,746,171 B2 | 6/2004 | Welch |
| 6,749,061 B2 | 6/2004 | Clausen |
| 6,749,357 B2 | 6/2004 | Cheng |
| 6,758,621 B2 | 7/2004 | To |
| 6,761,498 B1 | 7/2004 | Harris, Jr. et al. |
| 6,764,242 B1 | 7/2004 | Karten et al. |
| 6,769,829 B1 | 8/2004 | Castillo et al. |
| 6,840,695 B2 | 1/2005 | Horn |
| 6,843,505 B1 | 1/2005 | Eriksen |
| 6,845,795 B2 | 1/2005 | Lammers et al. |
| 6,854,915 B1 | 2/2005 | Ong |
| RE38,731 E | 5/2005 | To |
| 6,902,340 B2 * | 6/2005 | Harris et al. .................. 402/73 |
| 6,908,248 B2 | 6/2005 | Pangburn |
| 6,916,134 B2 | 7/2005 | Wong |
| 2001/0009631 A1 | 7/2001 | Brown et al. |
| 2002/0044819 A1 | 4/2002 | Shamoon |
| 2002/0051674 A1 | 5/2002 | To |
| 2002/0076262 A1 | 6/2002 | To |
| 2002/0085876 A1 | 7/2002 | Ko |
| 2002/0094226 A1 | 7/2002 | Sapienza et al. |
| 2002/0098031 A1 | 7/2002 | Brown et al. |
| 2002/0102125 A1 | 8/2002 | Sapienza et al. |
| 2002/0131810 A1 | 9/2002 | Whaley et al. |
| 2002/0146275 A1 | 10/2002 | Gerriet |
| 2002/0159816 A1 | 10/2002 | Gagnon et al. |
| 2002/0168250 A1 | 11/2002 | Welch |
| 2003/0035681 A1 | 2/2003 | Ho |
| 2003/0035932 A1 | 2/2003 | Yamamoto et al. |
| 2003/0044222 A1 | 3/2003 | Dahlke et al. |
| 2003/0053849 A1 | 3/2003 | To et al. |
| 2003/0073066 A1 | 4/2003 | Warden |
| 2003/0103796 A1 | 6/2003 | To et al. |
| 2003/0103798 A1 | 6/2003 | Cheng et al. |
| 2003/0113156 A1 | 6/2003 | To |
| 2003/0122366 A1 | 7/2003 | Sapienza et al. |
| 2003/0155761 A1 | 8/2003 | Stenger et al. |
| 2003/0157472 A1 | 8/2003 | Castillo et al. |
| 2003/0165644 A1 | 9/2003 | Meade et al. |
| 2003/0198504 A1 | 10/2003 | Hyman |
| 2003/0213886 A1 | 11/2003 | Gilbert |
| 2004/0013463 A1 | 1/2004 | To |
| 2004/0013464 A1 | 1/2004 | Cheng |
| 2004/0018040 A1 | 1/2004 | Ng et al. |
| 2004/0042844 A1 | 3/2004 | Ettro et al. |
| 2004/0066031 A1 | 4/2004 | Wong et al. |
| 2004/0067094 A1 | 4/2004 | Ko |
| 2004/0113036 A1 | 6/2004 | Gilbert |
| 2004/0151531 A1 | 8/2004 | Corr et al. |
| 2004/0164543 A1 | 8/2004 | Yamamoto et al. |
| 2004/0170468 A1 | 9/2004 | Chizmar |
| 2004/0197131 A1 | 10/2004 | Harris, Jr. et al. |
| 2004/0197758 A1 | 10/2004 | Langford |
| 2004/0208685 A1 | 10/2004 | Peters, Jr. |
| 2005/0013653 A1 | 1/2005 | Chin |
| 2005/0025563 A1 | 2/2005 | Sato et al. |
| 2005/0053417 A1 | 3/2005 | Yamamoto et al. |
| 2005/0058502 A1 | 3/2005 | Ben-Or |
| 2005/0097732 A1 | 5/2005 | Sato et al. |
| 2005/0105958 A1 | 5/2005 | Kaneda |
| 2005/0105960 A1 | 5/2005 | Wehmeyer |
| 2005/0117964 A1 | 6/2005 | Johnson et al. |
| 2005/0160642 A1 | 7/2005 | Schwartz |
| 2005/0163557 A1 | 7/2005 | England |
| 2005/0179247 A1 | 8/2005 | Hough et al. |

FOREIGN PATENT DOCUMENTS

| | | |
|---|---|---|
| DE | 29720425 | 1/1998 |
| FR | 2 524 377 | 10/1983 |
| FR | 2 816 882 | 5/2002 |
| GB | 363876 | 12/1931 |
| GB | 1 160 975 | 8/1969 |
| SE | 175812 | 12/1954 |
| SE | 200241 | 6/1961 |
| SE | 7801725-8 | 2/1978 |
| WO | 8 002 259 A | 10/1980 |
| WO | WO 92/21524 | 12/1992 |
| WO | WO 99/26791 | 6/1999 |

* cited by examiner

MOLDED BINDER

FIELD

Aspects of the inventions relate to binders for holding articles and more particularly to molded binders for holding loose-leaf papers and the like.

BACKGROUND

Binders are employed to hold articles, typically loose-leaf papers, documents, and the like. With repeated use, portions of the binder may prematurely fail.

Conventional loose-leaf binders include three panels: a front cover, a back cover and a spine panel, connected to one another by joints. In some binders, such as molded polypropylene binders, the joints are living hinges. In other binders, the panels are cardboard pieces which are covered by two sheets of plastic sealed around the edges and the joints and edges of the panels only include two sheets of plastic sealed together.

As is the case with most living hinges repeated use strains the material at the hinge. After repeated openings and closings of the binder, the living hinge will eventually fracture, rendering the binder unusable. Similarly, after repeated use or when a binder is fully loaded or over loaded, the hinges often tear. Other areas of the binder may also tear or wear with repeated use.

SUMMARY

Aspects of the invention are directed to improved binders constructed to reduce the incidence of premature degradation of joints, edges and/or other weak or stress points. The binder may be reinforced with a molding to strengthen weak or stress points and give the binder a longer life. The molding may be formed by any method, such as comolding or overmolding. In addition, some molding materials may have a more pliable or rubbery feel, providing a user with a better grip when the user contacts the molding.

According to one aspect of the invention, a binder is provided. The binder includes at least one binding mechanism, first and second panels cooperating with said at least one binding mechanism, and a molding located on a first portion of at least one of the first and second panels. The first and second panels are constructed and arranged to enclose an item retained in the at least one binding mechanism. The first and second panels include a panel material and the molding includes a molding material. The molding material and the panel material are different materials.

According to another aspect of the invention, a binder is provided. The binder includes a first panel, a second panel, a hinge having a first side and a second side located between said first and second panels, and a molding formed on or with at least a first portion of at least one of the first and second sides of said hinge.

According to yet another aspect of the invention, a method of making a binder having a first panel, a second panel and a hinge located between the first and second panels, is provided. The method includes providing the first and second panels and the hinge, placing the first and second panels and the hinge into a mold, and adding a molding material into the mold to locate the molding material on at least a first portion of the hinge.

According to still another aspect of the invention, a method of making a binder having a first panel, a second panel and a hinge located between the first and second panels, is provided. The method includes placing a panel material into a mold, forming the first and second panels and the hinge from the panel material, adding a molding material into the mold, and forming a molding on at least a first portion of the hinge.

According to still another aspect of the invention, a binder is provided. The binder includes a first panel, a second panel formed discretely from said first panel, and a molding which connects a first edge of the first panel to a second edge of the second panel. The molding has a first portion which covers the first edge, a second portion which covers the second edge, and a joining portion which extends between the first edge and the second edge. The first panel includes a first panel material, the second panel includes a second panel material, and the molding includes a molding material. The molding material is different from both the first and second panel materials.

Various embodiments of the present invention provide certain advantages. Not all embodiments of the invention share the same advantages and those that do may not share them under all circumstances.

Further features and advantages of the present invention, as well as the structure of various embodiments of the present invention are described in detail below with reference to the accompanying drawings.

BRIEF DESCRIPTION OF DRAWINGS

The accompanying drawings are not intended to be drawn to scale. In the drawings, similar features are represented by like reference numerals. For purposes of clarity, not every component is labeled in every drawing. In the drawings.

DETAILED DESCRIPTION

Figure 1:
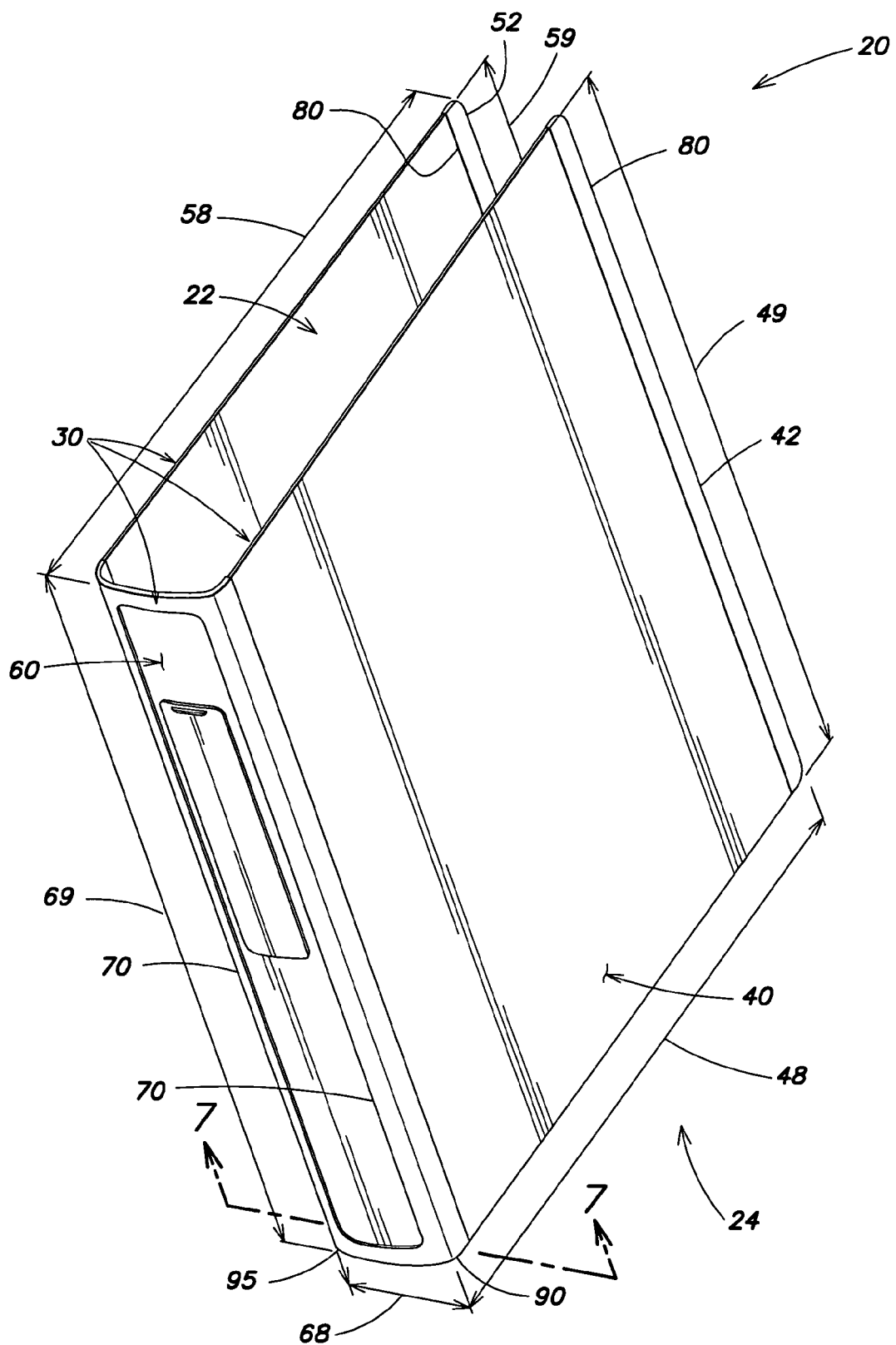
FIG. 1 is a perspective view of an illustrative embodiment of a binder in a closed position.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Aspects of the invention are described below with reference to illustrative embodiments. It should be understood that reference to these illustrative embodiments is not made to limit aspects of the invention in any way. Instead, illustrative embodiments are used to aid in the description and understanding of various aspects of the invention. Therefore, the following description is intended to be illustrative, not limiting.

Broadly, embodiments of the present invention are directed to a binder having one or more moldings thereon. The binder may have two cover panels, a spine panel connected to the two cover panels by hinges, and a binding mechanism connected to one of the panels and designed to receive an article, such as one or more sheets of loose-leaf paper and other such articles. Moldings may be located on the hinges to reinforce the hinge. In some embodiments, the molding may be located along the entire length of the hinge, while in other embodiments, the molding may be located in discrete sections spaced from one another along the hinge. The molding may be located on an inside and/or an outside of the hinge. In some embodiments, the panels may be discretely formed such that a hinge does not connect the adjacent panels to one another. In these embodiments, molding alone may connect the adjacent panels and allow the adjacent panels to rotate relative to one another. In some embodiments, the molding may be located on edges of the cover panels, such as along the entire edge or at the corners between the edges, or at other suitable locations, as the present invention is not limited in this respect.

In some embodiments, the thickness of the hinge may be less than the thickness of the panels. In these embodiments, the molding material may be added so that the resulting joint (i.e., the hinge with the molding thereon) has a thickness equal to or greater than the thickness of the adjoining panels. In addition, the panel edges may have a decreased thickness such that the addition of the molding creates an edge of equal or increased thickness with respect to the thickness of the adjoining panel.

The molding may include a molding material, which may be a different material than the material of the cover or spine panels. The molding material may be softer than the panel material, so that the molding does not inhibit the opening and closing of the binder. The molding material may provide increased traction and/or a more cushioned grip for the user. For example, the panels may be made from polypropylene, while the molding is formed of a thermoplastic elastomer (TPE) of a lesser durometer.

To apply the molding to the panels, any suitable technique may be employed, such as comolding or overmolding in conjunction with injection molding, vacuum molding, blow molding, compression molding, transfer molding, extrusion, casting, and/or thermoforming. In one embodiment, the molding material may be heated to its plastic-flow phase and injected or drawn via a vacuum into a mold in which the panels were previously placed or formed. The molding material may then be allowed to solidify about the panels. In another embodiment, both the molding material and panel material may be heated to a molten or plastic-flow phase and injected into a mold at substantially the same time and cooled substantially simultaneously or sequentially until both materials are solid and bonded together. In a further embodiment, the molding material may be disposed on preformed panels in a desired location and may be cut, molded, such as by heat molding, or otherwise shaped into a desired configuration. In some embodiments, the molding material may form mechanical bond(s), chemical bond(s) and/or other connection(s) with the panel material.

It should be appreciated that various combinations of the above-described features can be employed together; however several aspects of the present invention are not limited in this respect. Therefore, although the specific embodiments disclosed in the figures and described in detail below employ particular combinations of the above-discussed features, it should be appreciated that the present invention is not limited in this respect, as the various aspects of the present invention can be employed separately, or in different combinations. Thus, the particular embodiments described in detail below are provided for illustrative purposes only.

FIG. 1 shows an illustrative embodiment of a binder in accordance with one aspect of the invention. In this embodiment, the binder 20 may include panels 30 designed to enclose the item placed therein. Panels 30 may include first panel 40 and second panel 50 which may be respectively connected to spine panel 60 by first and second hinges 90, 95. Molding 70, 80 may be configured to respectively reinforce hinges 90, 95 and edges of the panels which are adjacent and opposite hinges 90, 95.

To increase the resiliency and strength of weaker or stressed areas, molding may be applied to these areas of the binder. Joints are areas of a binder that may be stressed each time the binder is opened and closed. Edges of binders are areas which may be constantly handled and used as grips. Molding may be applied to the joints, edges or any other portion of the binder to reinforce and strengthen (as well as in some embodiments provide an increased grip), these areas which are repeatedly strained.

Figure 2:
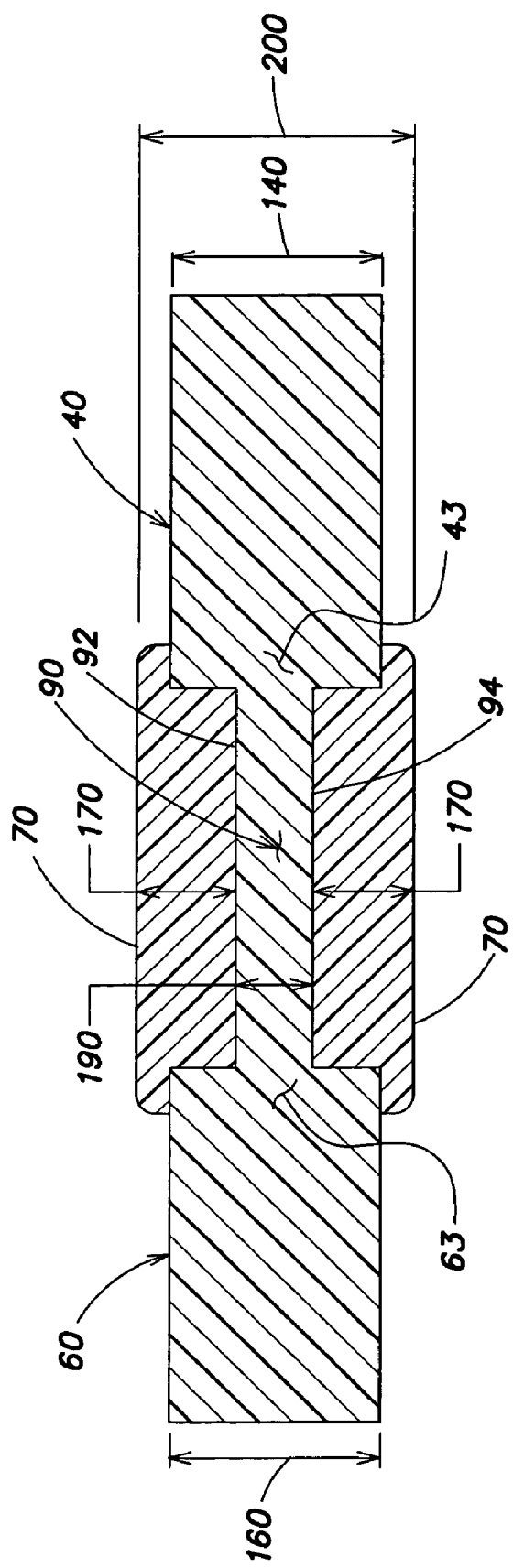
FIG. 2 is an enlarged, cross-sectional view of an illustrative embodiment of a joint of a binder in an opened position.
Figure 3:
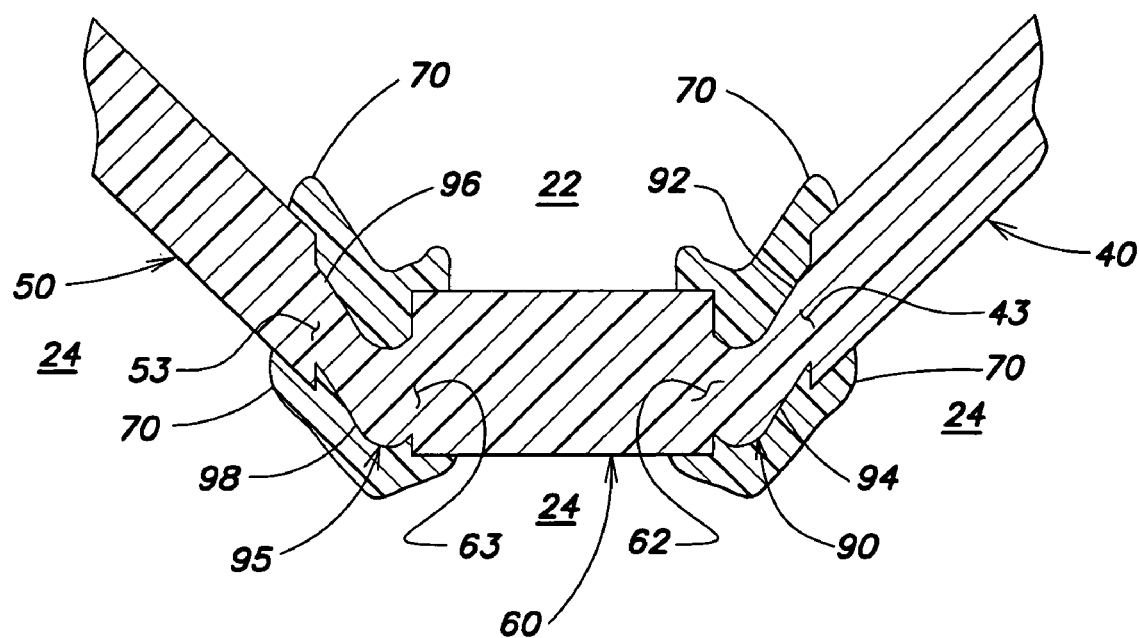
FIG. 3 is an enlarged, cross-sectional view of an illustrative embodiment of a binder in a partially opened position.
Figure 4:
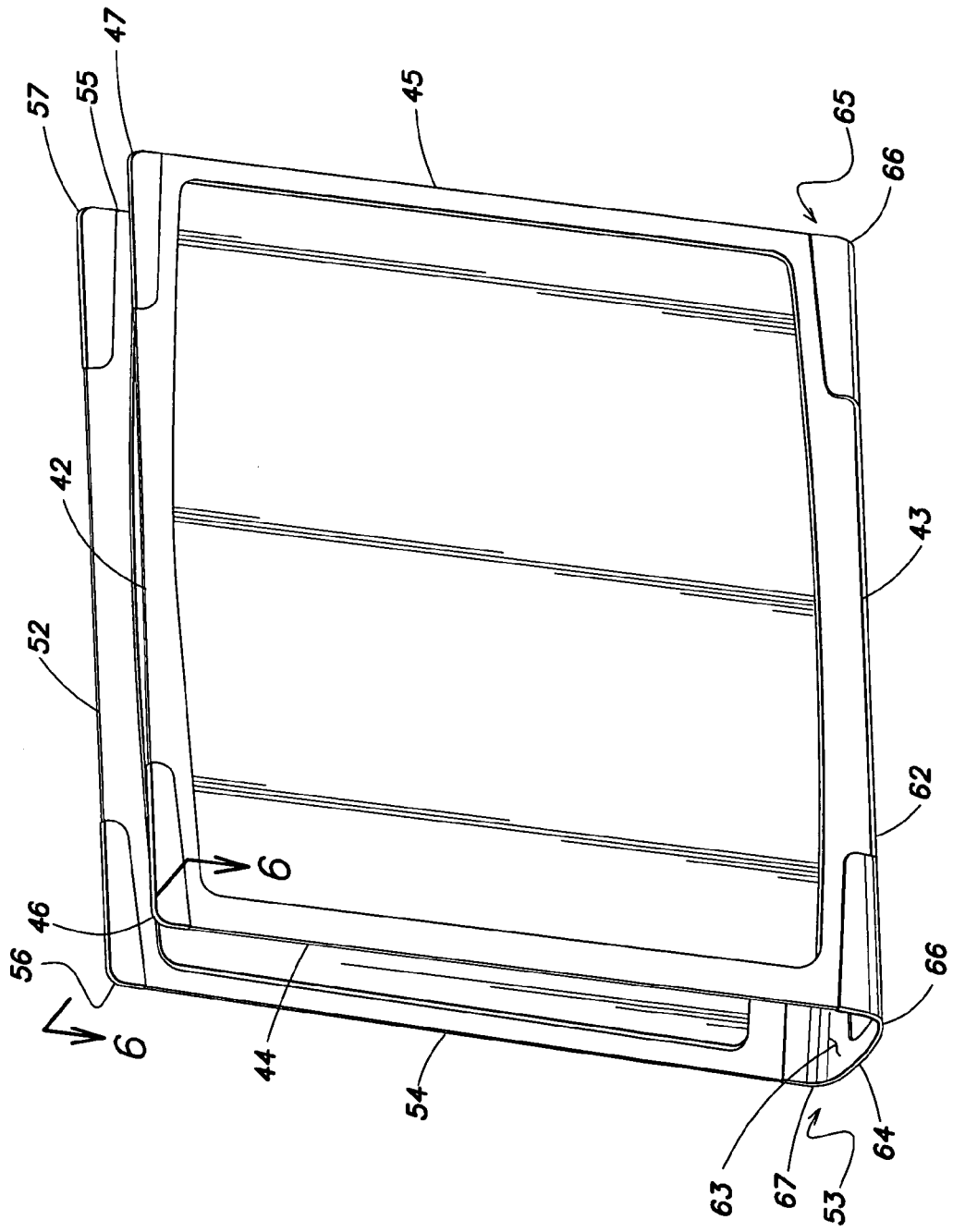
FIG. 4 is a perspective view of an illustrative embodiment of a binder in a closed position.

As shown in the respective embodiments depicted in FIGS. 1 and 4, molding 70, 80 may extend along the entire length of hinges 90, 95 and edges 42, 52 or may be applied in discrete section at the ends of the hinges 90, 95 and corners 46, 47, 56, 57 of edges 42, 52. In addition or alternatively, a portion of the molding may extend onto a portion of the adjacent panels. As shown in the embodiments of FIGS. 2 and 3, molding 70 extends onto hinge sides 43, 53 of first and second panels 40, 50 and into first and second sides 62, 63 of spine panel 60.

Figure 5:
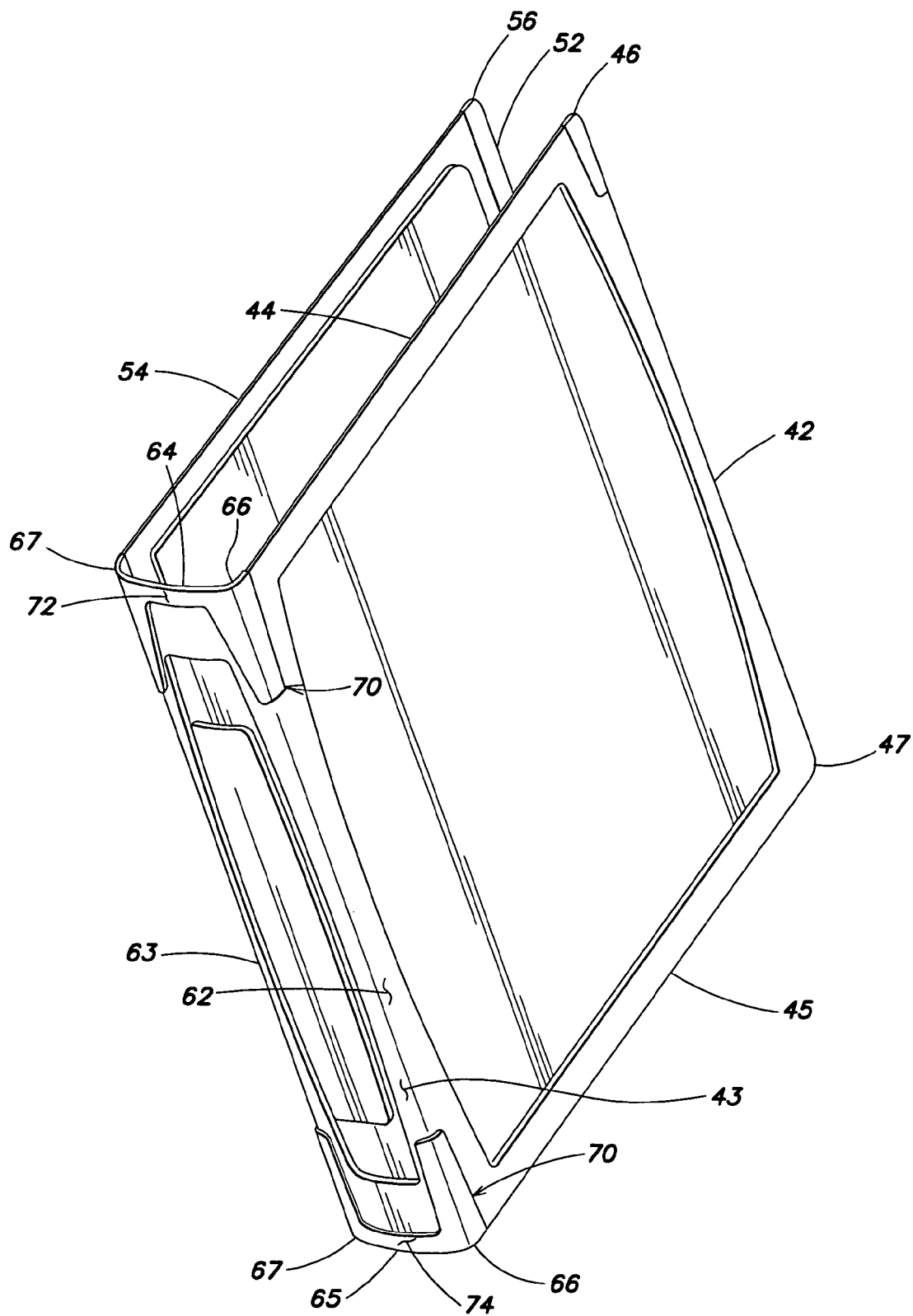
FIG. 5 is a perspective view of an illustrative embodiment of a binder in a closed position.

As shown in the embodiments depicted in FIGS. 4 and 5, molding 70 may include to two bracket-shaped (e.g., "[ ]") sections 72, 74, wherein section 72 is located along second edge 64 of spine panel 60 and at the top portions of hinges 90, 95 and of sides 43, 53, 62, 63 and section 74 is located along third edge 65 of spine panel 60 and at the bottom portions of hinges 90, 95 and of sides 43, 53, 62, 63. Although the embodiments of FIGS. 1, 4 and 5 depict molding 70 as extending along second and third edges 64, 65 of spine panel 60 between first hinge 90 and second hinge 95, it should be appreciated that the molding may only be located along the hinge, may extend along portions of or entire edges of the spine panel, may extend along the entire spine panel and/or may be located at discrete portions on the spine panel as the present invention is not intended to be limited in this respect. In addition or alternatively, the width and the thickness of the molding may vary from section to section or within one section. For example, a section of molding on a hinge may have a wider and thicker portion located most proximate the second or third edges of a panel, while a less wide and less thick portion of that same section of molding may be located more distal the second or third edges of that panel.

In some embodiments, a joint need not contain a hinge connecting the adjacent panels and molding alone may allow the adjacent panels to rotate relative to one another. As shown in the embodiment depicted in FIG. 9, joint 36 may only contain molding 70—in contrast to also containing first hinge 90, as shown in the embodiments depicted in FIGS. 2 and 8. Molding 70 may be applied to hinge side 43 of first panel 40 and hinge side 53 of second panel 50 with a width 71 therebetween. Width 71 may be wide enough to permit first panel 40 and second panel 60 to rotate about joint 36.

Figure 6:
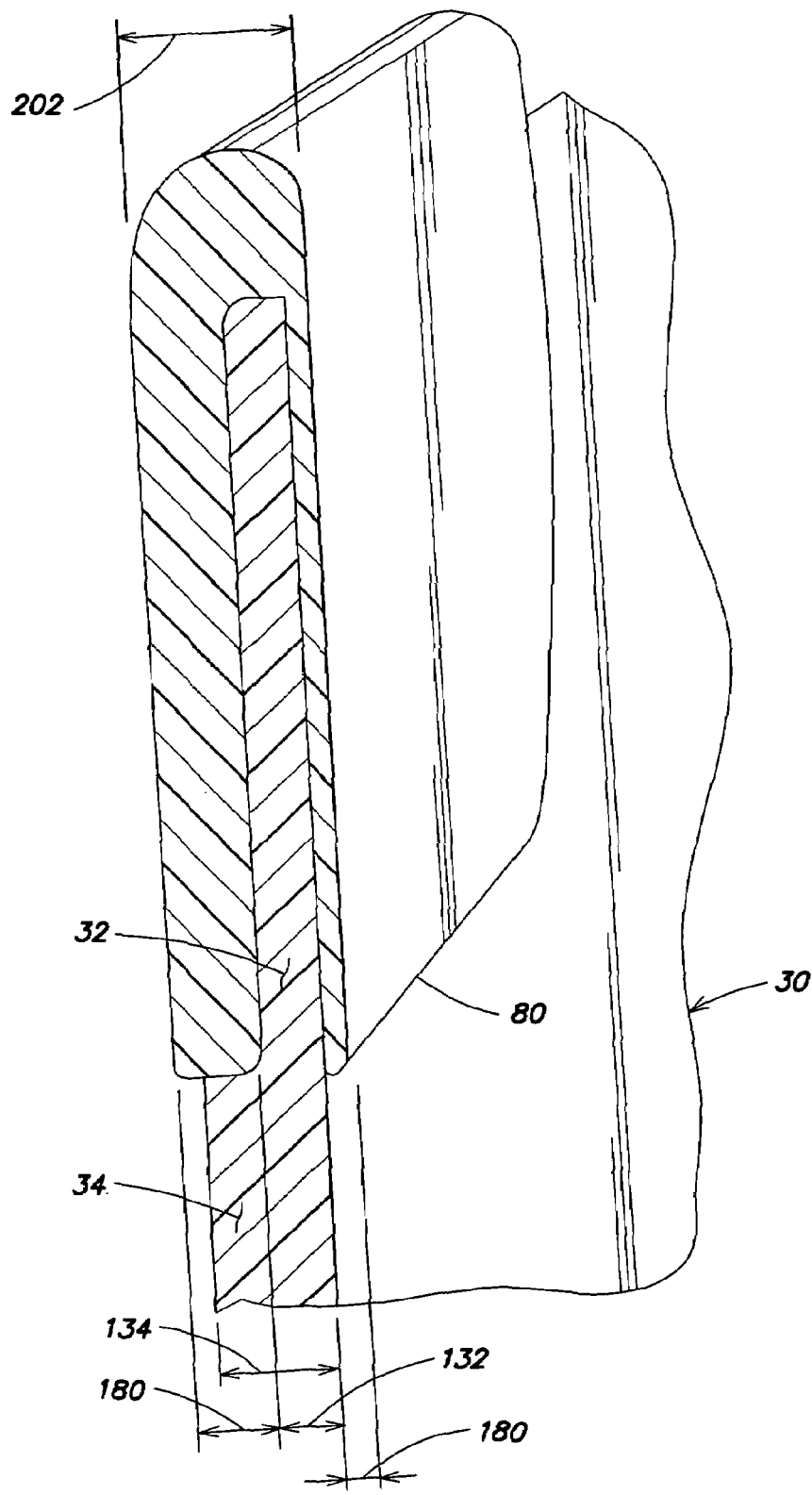
FIG. 6 is an enlarged, cross-sectional, perspective view of an illustrative embodiment of an edge of a binder taken along line 6-6 of FIG. 4.
Figure 7:
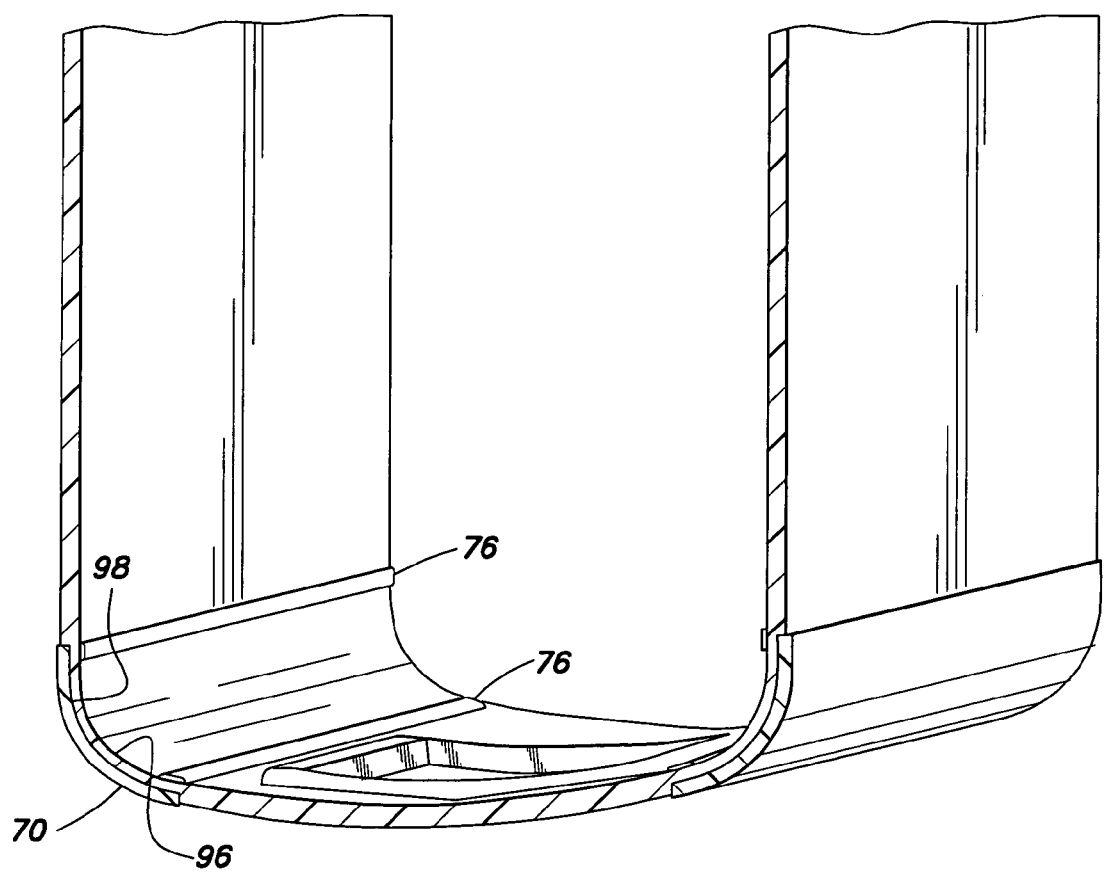
FIG. 7 is an enlarged, cross-sectional view of an illustrative embodiment of a binder taken along line 7-7 of FIG. 1.

Depending on the desired magnitude of reinforcement, molding may be applied to one or both sides of the hinge and/or edge. As depicted in the embodiment of FIGS. 3, molding 70 may be applied to first sides 92, 96 (which are located on an internal side 22 of the binder proximate the items to be retained) and/or to second sides 94, 98 (which are located on an external side 24 of the binder) of hinges 90, 95. Similarly, as shown in the embodiment of FIG. 6, molding 80 may be applied to one or both sides of the edges of the panels (first edges 42 of first panel 40 is shown). In addition or alternatively, in some embodiments, a binder may have one hinge or one edge having molding on both sides and another hinge or another edge only having molding on one side. In some embodiments, as is depicted in the embodiment of FIG. 7, the entire first side 98 of the second hinge 95 may be covered with molding 70, while the second side 96 of second hinge 95 may only contain two strips 76 of molding 70 on either edge of the hinge. Not all embodiments of present invention are intended to be limited in these respects.

To allow for the molding to be flush with the surface of the panels, in some embodiments the thickness of the panels may be decreased in the area on which the molding will be located. However, in some embodiments wherein the molding may protrude from the surface of the panels, the panels may still have a decreased thickness underneath the molding. As shown in the embodiment of FIG. 2, although first and second thicknesses 140, 160 of the first and spine panels 40, 60 respectively may each be greater than a third thickness 190 of the first hinge, the combined thickness 200 of fourth thickness 170 of molding 70 with third thickness 190 is greater than both first and second thicknesses 140, 160 of panels 40, 60. In some embodiments, the combined thickness of the molding and the hinge may be equal to, less than, or greater than the thickness of one or both of the adjoining panels and the thickness of the hinge alone may be equal to, less than or greater than one or both of the adjoining panels, as not all embodiments of the present invention are intended to be limited in these respects.

As shown in the embodiment of FIG. 6, a first thickness 132 of a first portion 32 of panel 30 on which molding 80 is located may be less than a second thickness 134 of a second portion 34 of panel 30 which does not have any molding located thereon. A combined thickness 202 of a third thickness 180 of molding 80 with first thickness 132 may be greater than second thickness 134. It should be appreciated that the combined thickness of the molding and the first portion of the panel may be equal to, less than, or greater than the thickness of one or both of the adjoining panels and the thickness of the hinge alone may be equal to, less than or greater than one or both of the adjoining panels, as not all embodiments of the present invention are intended to be limited in these respects.

To enable the binder to bend at the hinges while simultaneous strengthening the resiliency of the hinge, a desirable molding material may have the elastic ability to be deformed without becoming brittle. In some embodiments, a molding material may include a thermoplastic elastomer. Thermoplastic elastomers (TPEs) are a group of materials having properties which fall between cured rubbers and soft plastics and are hybrid material systems having a hard thermoplastic phase and a soft elastomeric phase. TPEs may be generally characterized by low cost, and a good combination of mechanical properties at or near room temperature, including low specific gravities (0.9-1.0), hardness ranging from 50 shore A to 60 Shore D, and ultimate tensile strengths from 600 to 3000 psi.

The TPE hard thermoplastic phase may be a single or a combination of polymers, including, but not limited to, styrenic (e.g., polystyrene), olefinic (e.g., polyethylene, polypropylene), crosslinkable polyolefins, polyester, polyamide, polyurethane, and halogenated polymers (e.g., polyvinyl chloride). The TPE soft elastomeric phase may be, for example, ethylene-propylene rubber (EPR), nitrile-butadiene rubber (NBR), or ethylene-propylene-diene monomer rubber (EPDM). TPE materials may be thermoplastic vulcanizates (TPVs).

In some embodiments, the molding material may include TPE materials having low durometers. In particular, the TPE materials may have a durometer between 40 Shore A and 90 Shore A, between 50 Shore A and 80 Shore A, between 60 Shore A and 75 Shore A, less than 40 Shore A or more than 90 Shore A, as the present invention is not intended to be limited in this respect.

In some embodiments, the molding material may include other materials in addition to or in lieu of TPE. These materials may include, but are not limited to other thermoplastic polymers, such as amorphous, semicrystalline or crystalline materials.

It should be appreciated that the molding material may include a variety of other components. Such components may be other polymeric materials, fillers, nucleating agents, plasticizers, lubricants, colorants or any other additive or processing aid known in the art; however it should be appreciated that references in this specification to 'different materials' does not include merely changing the color of a material by adding a colorant. Two materials should have other dissimilarities besides a different color or colorant agent to be considered 'different materials.'

However, it should be understood that the molding material may also include other types of thermoplastic materials, such as thermosetting polymers, other elastomers, other polymers, such as polyvinyl chloride, polyethylene, acrylic, silicone, urethane, other plastics, natural or synthetic rubber, natural or synthetic fibers, a similar material to that of one or more of the panels, any other material or any combination thereof, as not all embodiments of the present invention are not intended to be limited in this respect.

In one embodiment, the molding material may be less hard than a material of the panels. In some embodiments, a first hardness or durometer of a molding material may be less than a second hardness or durometer of a panel material. It should be appreciated that different portions of molding and panels may have different durometers than the durometers of other respective portions of moldings and panels. In addition or alternatively, a durometer of a molding material may be less than, equal to or even greater than a durometer of a panel material, as not all embodiments of the present invention are not intended to be limited in these respects.

To attach the molding to the panels of the binder, the molding may be overmolded on the panels or comolded with the panels.

Before overmolding the molding on the panels, the panels are formed first by processes such as injection molding, insert molding, extrusion, compression, vacuum molding, contact molding, thermoforming, casting or any other suitable processing technique. To overmold the molding on the panels, the formed panels may be placed in a mold form with the molding located therein. Molten or viscous molding material may be added to the second process' mold form already containing the formed panels and may then be allowed to solidify on an exterior surface of the formed panels.

To comold the molding with the panels, one mold form may be employed to shape the molten or liquid materials.

Comolding may entail forming both the panels and the molding either substantially simultaneously or sequentially in the one mold. In some embodiments the panels may first be formed in one mold and then the molding may be added into that same mold and allowed to solidify. In some embodiments, both the panel material and the molding material may be added to the same mold and allowed to solidify simultaneously or sequentially.

Comolding and overmolding may be accomplished by using techniques such as injection, insert, multi-shot, rotational, shuttle table, compression and blow molding as well as extrusion, thermoforming, casting any combination thereof or any other processing or molding techniques, as not all embodiments of the present invention are intended to be limited in these respects.

In one embodiment in which an overmolding technique is employed, the panels may first be formed by extruding polypropylene. The hinge areas of the extruded polypropylene panels may then be coined to create living hinges between the panels. The panels may then be inserted into a mold form. TPE may be heated to its molten state and forced under pressure into the mold cavity to fill in the spaces between the mold walls and the panels. The mold may then be cooled, thereby allowing the TPE to cool.

In another embodiment in which a comolding technique is employed, a molten polypropylene may be injected into a mold form. Once the polypropylene begins to solidify, a molten TPE may be injected into that same mold form. The molten TPE may solidify on the polypropylene, creating molded portions of the binder panels.

Figure 8:
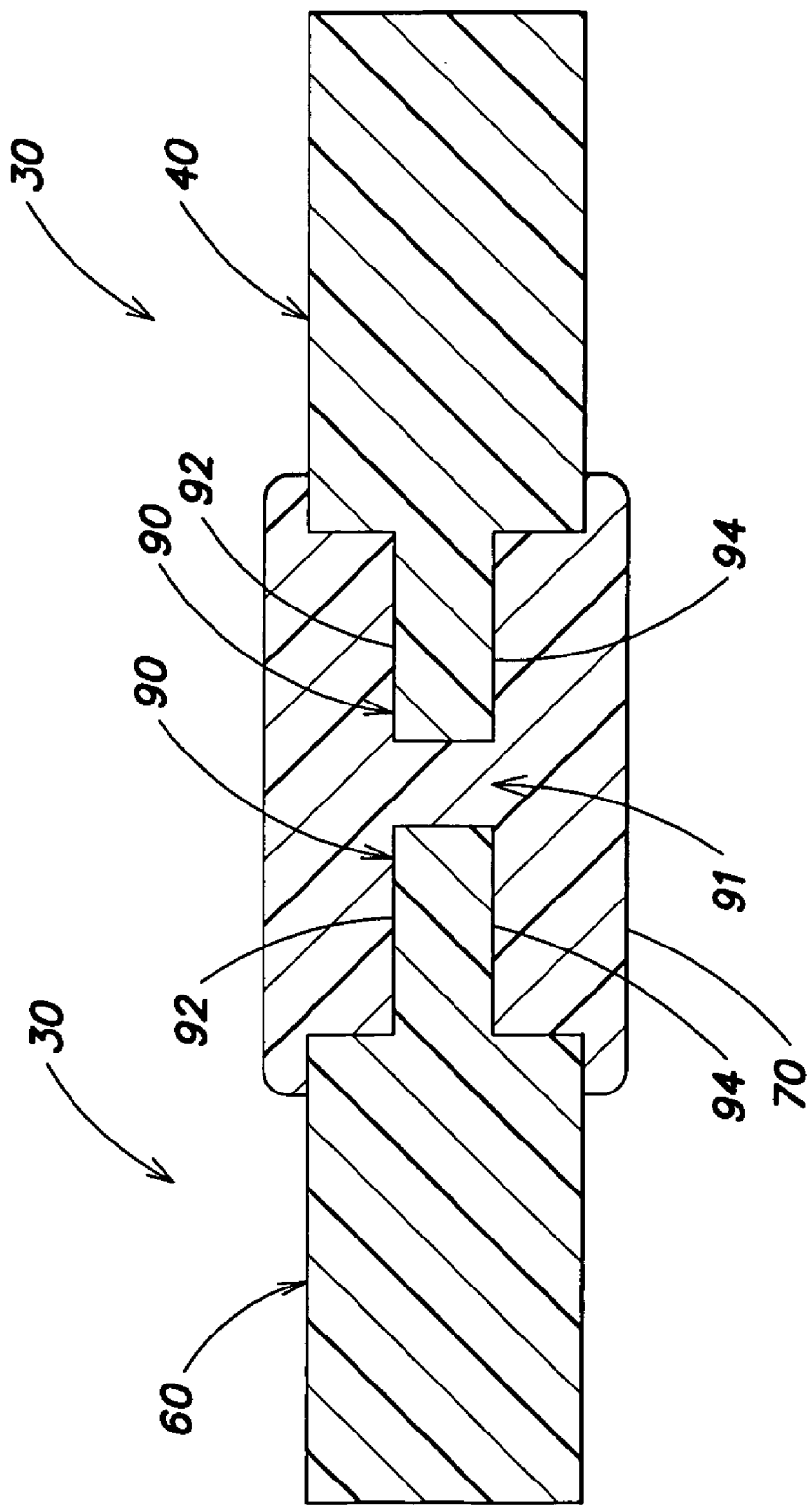
FIG. 8 is an enlarged, cross-sectional view of an illustrative embodiment of a joint of a binder in an opened position.
Figure 9:
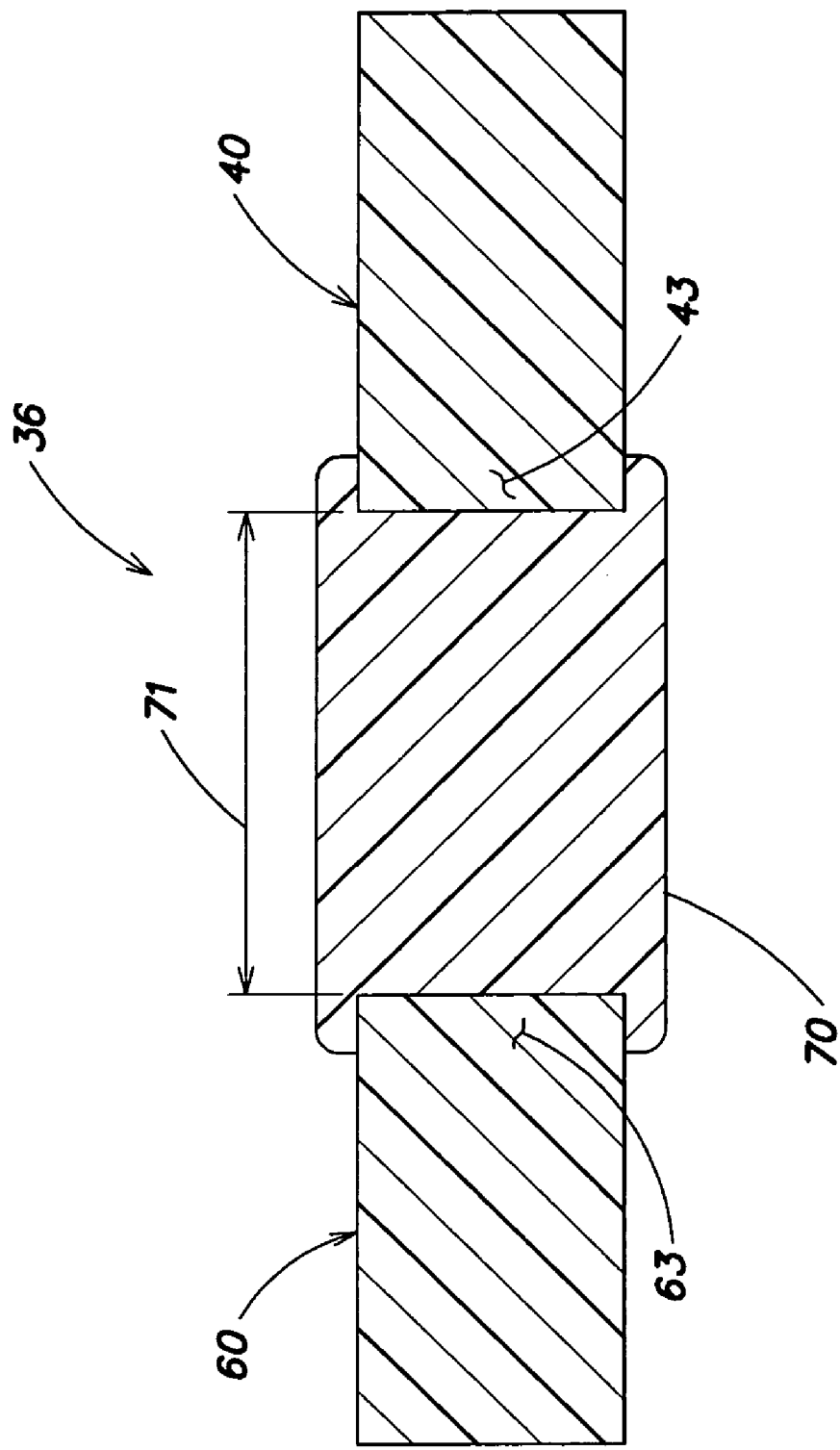
FIG. 9 is an enlarged, cross-sectional view of an illustrative embodiment of a joint of a binder in an opened position without a hinge.

Depending on the materials used in the molding and in the panels, the molding and panel materials may join together in a variety of ways. In some embodiments, a molten molding material may form a mechanical bond with the panel material. In addition or alternatively, a molten molding material may form chemical bonds with a molten or semi-molten panel material, as the present invention is not intended to be limited in these respects. In some embodiments, the panel may have preformed holes through the panel material through which the molten molding material may be injected, so that the molten molding material may solidify in and around those holes creating a stronger mechanical bond. For example, as is depicted in the embodiment of FIG. 8, first hinge 90 may have a hole 91 extending from first side 92 of first hinge 90 to second side 94 of first hinge 90, such that when molding 70 is applied to panels 30, molding 70 may spread between first side 92 and second side 94 through hole 91.

It should be appreciated that the hinges of the binder may be any type of hinge. For example, as shown in the embodiments of FIGS. 1-3, first and second hinges 90, 95 may be living hinges (e.g., a hinge with no moving parts which may be a thin section of material which bends to allow movement of the items on either side of the hinge). First and second hinges 90, 95 may be made by coining or otherwise compressing or removing some of the panel material to create a thinner portion between panels. In some embodiments (not shown), the first and second hinges may include two thin films of plastic heat sealed together. In other embodiments, similar to those depicted in FIGS. 4 and 5, the first and second hinges may be overcenter hinges, so that the hinges may bias the binder into both open and closed positions. It should be appreciated that first and second hinges need not be the same type of mechanism. Also, each hinge may be any type of mechanism which connects the panels and allows rotation therebetween, such as a butt hinge, a butterfly hinge, a flush hinge, a barrel hinge, a concealed hinge, piano or continuous hinge, a pin hinge, a spring hinge a living hinge, a heat sealed hinge, an overcenter hinge and/or any combination thereof, as the present invention is not intended to be limited in these respects. As discussed above with regard to the embodiment of FIG. 9, some embodiments may have panels which are discretely formed and connected to one another only by the molding and may not have hinges at all; rather the molding acts as the flexible joint between the panels.

Opposite the hinge sides of the first and second panels are first edges 42, 52. As shown in the embodiments depicted in FIGS. 1 and 4, first edge 42 of first panel 40 may be located on first panel 40 most distal first hinge 90 and first edge 52 of second panel 50 may be located on second panel 50 most distal second hinge 95. Connecting first edge 42 of first panel 40 to first hinge 90 may be second and third edges 44, 45 of first panel 40 and connecting first edge 52 of second panel 50 to second hinge 95 may be second and third edges 54, 55 of second panel 50. First corners 46, 56 of first and second panels 40, 50 may respectively be formed by the convergence of first and second edges 42, 44, 52, 54 of first and second panels 40, 50. Second corners 47, 57 of first and second panels 40, 50 may respectively be formed by the convergence of first and third edges 42, 45, 52, 55 of first and second panels 40, 50.

In one embodiment as depicted in FIG. 4, first corners 66 of spine panel 60 may be located at both ends of first side 62 of spine panel 60, while second corners 67 of spine panel 60 may be located at both ends of second side 63 of spine panel 60. Second edge 44 of first panel 40 may be connected to second edge 54 of second panel 50 via one of first corners 66, second edge 64 of spine panel 60 and one of second corners 67. Third edge 45 of first panel 40 may be connected to third edge 55 of second panel 50 via another of first corners 66, third edge 65 of spine panel 60 and another of second corners 67.

Panels 30 may be designed to protect the item retained by the binding mechanism. In one illustrative embodiment, panels 30 may be molded polypropylene. Panels 30 may be made from any material, such as plastics including polyolefins, such as polyethylene and polypropylene, styrenic polymers, fluoropolymers, crosslinkable polyolefins, polyamides, polyaromatics, such as polystyrene, vinyls, such as polyvinyl chloride (PVC), nylon, orlon, rayon and/or any combination thereof, paper, woven natural or synthetic fibers, cardboard, rubber, any combination thereof or any other material, as not all embodiments of the present invention are intended to be limited in this respect. In one embodiment, the panels may include cardboard covered by two thin PVC sheets which are joined to one another around the periphery of the cardboard using a welding or sealing technique, such as radio frequency or ultrasonic welding, or heat sealing. In addition, the panel material may be stiff, so that panels 30 may not bend, or may have any degree of flexibility. Also, the panels may have any shape, such as rectangular, square, round, triangular and octagonal, as the present invention is not intended to be limiting in these respects.

To cover the items to be retained, first panel 40 and second panel 50 may have widths 48, 58 and heights 49, 59 designed to be slightly greater than the respective width and height of the items to be retained. For example, if the binder is designed to retain standard 8½×11 inch sheets of loose leaf paper, widths 48, 58 of panels 40, 50 may be 9½ inches, and heights 49, 59 of panels 40, 50 may be 12 inches, half an inch greater than the dimensions of the sheet on each side. It should be appreciated that the dimensions of the panel may depend on the item to be retained, so that the panel dimensions may be the same as, small than, or greater than by ¼, ½, ¾, 1 or more inches, the dimensions of the item to be retained, or may be independent of the item to be retained, as the present invention is not intended to be limited in this respect.

Although in some embodiments, the height 69 of spine panel 60 may be the same as heights 49, 59, width 68 of spine panel 60 may depend on the number of items the binder is designed to retain. For example, if retaining items having a total thickness of about ¾ of an inch is desired, spine panel width 68 may be 1 inch. It should be appreciated that the present invention includes, but is not limited to, conventional binder widths, such as ½, 1, 1½, 2, 3, 4 and 5 inch binders, but may have any width. In addition, panels 30 may have any thickness and this panel thickness in relation to the hinge and molding thicknesses will be discussed further below.

Even though some of the above-described embodiments are explained with the binder having three panels: two cover panels and a spine panel, it should be appreciated that the binder need not have three panels and may have any number of panels, as not all embodiments of the present invention are intended to be limited in this respect. In some embodiments, the binder may include two cover panels connected to one another by a single hinge element and may not have a spine panel. In these embodiments, the binding mechanism may be a conventional 3-ring binding device, the binder may be a folder with pockets, such that the binding mechanisms of the folder are the pockets, and/or the binder may be a hanging folder and the binding mechanism may be the panels themselves. In other embodiments, the binder may include four or more panels. Examples of these embodiments may include a binder having a fourth panel attached to a first cover panels and designed to overlap and possibly attach to the second cover panel when the binder is in a closed position or an easel binder, and may include a 3-ring binder, which rather than a spine panel, has a series of panels with small widths, which allow the spine panel to form a rounded configuration about the rings.

It should also be appreciated that the binder need not be a standard 3-ring binder and may be a hanging folder, a pocketed folder, a planner, a calendar, a photograph album, a CD or DVD album, a scrapbook, a portfolio, a report cover or other sheet protector, or other office supply products designed to retain items between two covers or panels rotatably connected to one another. In addition, the binder may have any number of additional elements, such as elastic or fasteners designed to releasably retain the binder in a closed position, pockets on the inside or outside of the panels, clear plastic windows on the panels for labels and/or other identifying indicia, as the present invention is not intended to be limited in this respect.

To retain items in the binder, a binding mechanism may be attached to the panels. In some embodiments to retain loose-leaf papers with two or three holes therein, the binding mechanism may include rings designed to retain the holes in the papers, such as those described in commonly owned U.S. patent application Ser. Nos. 11/301,337, 11/301,337, and 11/301,338, all of which were filed on Dec. 15, 2005, which are hereby incorporated herein by reference in their respective entireties. These rings may be repeatedly movable between opened and closed positions to allow insertion and removal of papers. In other embodiments, the binding mechanism may include binder clips, paperclips, latches, or any other retaining mechanism. In some embodiments, the binding mechanism may be attached to the spine panel, while in other embodiments, the binding mechanism may be attached to the first or second panels, as the present invention is not intended to be limited in these respects.

Although the above-described molding materials, location, and applications are explained with regard to molding being located on a hinge or an edge of a binder, it should be appreciated that the molding may be located anywhere on the binder. For example, molding may be used as reinforcement for thin cover panels and applied in a structural (e.g., a truss or grid-like pattern) and/or aesthetic (e.g., random polka dots) design. In some embodiments, the cover and/or spine panels may include molding in the shape of a hand, so that a user can use the molding as a grip to open the binder or remove the binder from a shelf. In some embodiments, the spine panel of a larger width (e.g., 4 or 5 inch) binder may need reinforcing and molding may be applied to the spine panel. Also, in some embodiments, the molding may be used to reinforce or add traction or grip to a portion of the binding mechanism, such as a user depressible button.

As described above, it should be appreciated that any materials, such as metals, plastics, rubbers, woods, foams, or any other natural or synthetic material, having any color, texture or other properties, may be used to make any of the elements of the binder, as not all of the embodiments of the present invention are intended to be limited in this respect. Further, some elements may be made from one material while other components may be made from another material or one component may be made from more than one material, as not all embodiments of the present invention are intended to be limited in this respect.

It should be appreciated that a variety of features employed in the art of binders may be used in combination with or to modify the above-described features and embodiments.

The foregoing written specification is to be considered to be sufficient to enable one skilled in the art to practice the invention. While the best mode for carrying out the invention has been described in detail, those skilled in the art to which this invention relates will recognize various alternative embodiments including those mentioned above as defined by the following claims. The examples disclosed herein are not to be construed as limiting of the invention as they are intended merely as illustrative of particular embodiments of the invention as enabled herein. Therefore, systems and methods that are functionally equivalent to those described herein are within the spirit and scope of the claims appended hereto. Indeed, various modifications of the invention in addition to those shown and described herein will become apparent to those skilled in the art from the foregoing description and fall within the scope of the appended claims.

What is claimed is:

1. A binder for retaining an item, the binder comprising:
   first and second panels constructed and arranged to at least partially cover the retained item, said first and second panels including a panel material; and
   a molding molded on or with a first portion of at least one of said first and second panels, said molding including a molding material, the molding material and the panel material being different materials,
   wherein the at least one of said first and second panels has the first portion on which said molding is located and a second portion which does not have any molding located thereon, the first portion has a first thickness and the second portion has a second thickness, the molding has a third thickness, and wherein the second thickness is greater than the first thickness and a combination of the first and third thicknesses is greater than or equal to the second thickness.

2. The binder of claim 1, wherein the molding material has a first hardness and the panel material has a second hardness, and wherein the first hardness is less hard than the second hardness.

3. The binder of claim 1, wherein the at least one of said first and second panels has a first edge and wherein the first portion on which said molding is located includes at least a portion of the first edge.

4. The binder of claim 3, wherein the at least one of said first and second panels has a second edge, a third edge, a first corner defined by a convergence of the first and second edges, and a second corner defined by a convergence of the first and third edges, wherein the first portion includes at least two discrete sections, the two discrete sections including a first section and a second section spaced from the first section, and wherein the first section is located at the first corner and the second section is located at the second corner.

5. The binder of claim 3, wherein the first portion is located along an entire length of the first edge.

6. The binder of claim 3, further comprising a spine panel and first and second hinges connecting the spine panel to said first and second panels, respectively, and wherein the molding covered portion of the at least one of said first and second panels includes at least a portion of the respective hinge.

7. The binder of claim 1, wherein said molding is overmolded onto the at least one of said first and second panels.

8. The binder of claim 1, wherein said molding is comolded with the at least one of said first and second panels.

9. The binder of claim 1, further comprising at least one binding mechanism cooperating with said first and second panels, the item being retained in said at least one binding mechanism.

10. A binder comprising:
a first panel;
a second panel;
a hinge located between said first and second panels, said hinge having a first side and a second side; and
a molding molded on or with at least a first portion of at least one of the first and second sides of said hinge,
wherein said first panel has a first panel thickness, said second panel has a second panel thickness, said hinge has a hinge thickness, and said molding has a molding thickness, wherein the hinge thickness is less than at least one of the panel thicknesses, and a combination of the hinge and molding thicknesses is greater than or equal to at least one of the panel thicknesses.

11. The binder of claim 10, wherein said molding includes a molding material having a first hardness and said hinge includes a hinge material having a second hardness, and wherein the first hardness is less hard than the second hardness.

12. The binder of claim 10, wherein said molding includes thermoplastic elastomer.

13. The binder of claim 10, wherein said hinge is formed integrally with the first and second panels.

14. The binder of claim 10, wherein said hinge is a living hinge.

15. The binder of claim 10, wherein said hinge includes polypropylene.

16. The binder of claim 10, wherein said first and second panels are each formed as a continuous piece of plastic.

17. The binder of claim 16, wherein the continuous piece of plastic includes polypropylene.

18. The binder of claim 10, wherein said molding is located on at least a portion of both the first and second sides of said hinge.

19. The binder of claim 10, wherein said first and second panels include a panel portion adjacent said hinge, and wherein said molding is formed on or with the panel portion adjacent said hinge.

20. The binder of claim 10, wherein said molding is located along an entire length of the at least one of said first and second sides of said hinge.

21. The binder of claim 10, wherein said hinge has a first end and a second end, wherein the first portion includes at least two discrete sections, the two discrete sections includes a first section and a second section spaced from the first section, and wherein the first section is located at the first end and the second section is located at the second end.

22. The binder of claim 10, further comprising at least one binding mechanism cooperating with said first and second panels.

23. The binder of claim 22, wherein said first panel is a first cover panel of the binder and said second panel is a spine panel of the binder.

24. The binder of claim 23, further comprising a third panel being a second cover panel of the binder and a second hinge connecting said third panel to the spine panel.

25. The binder of claim 22, wherein said first panel is a first cover panel of the binder and said second panel is a second cover panel of the binder.

26. A method of making a binder including a first panel and a second panel, the method comprising:
placing a preformed or fluid material in a mold so as to form the first panel and the second panel, an area between the panels defining a joint;
adding a molding material into the mold; and
forming a molding on at least a portion of at least one of the first panel, the second panel, and the joint, the molding formed of a thermoplastic elastomer and the first and second panels formed of a material that is substantially harder than the material of the molding.

27. The method of claim 26, wherein placing a preformed or fluid material in a mold so as to form the first panel and the second panel comprises placing preformed first and second panels into the mold before adding the molding material into the mold.

28. The method of claim 26, wherein placing a preformed or fluid material in a mold so as to form the first panel and the second panel comprises placing fluid material into the mold and forming the first and second panels in the mold before adding the molding material.

29. The method of claim 28, wherein forming the first and second panels occurs at approximately the same time as forming the molding.

30. The method of claim 28, wherein adding the molding material and forming the molding occur after forming the first and second panels.

31. The method of claim 26, wherein forming a molding on at least a portion of at least one of the first panel, the second panel, and the joint comprises forming a molding on at least a section of one of the first and second panels that is spaced from the joint.

32. The method of claim 26, wherein the joint includes a hinge located between the first and second panels and wherein forming a molding on at least a portion of at least one of the first panel, the second panel, and the joint comprises forming the molding at the joint.

33. The method of claim 32, wherein the joint includes a hinge located between the first and second panels and wherein forming a molding on at least a portion of at least one of the first panel, the second panel, and the joint comprises forming the molding on at least a section of the hinge.

34. A binder comprising:
a first panel including a first panel material;
a second panel formed discretely from said first panel, said second panel including a second panel material; and a molding connecting a first hinge edge of said first panel to a second hinge edge of said second panel, said molding having a first portion which covers the first hinge edge, a second portion which covers the second hinge edge, and a joining portion which extends between the first hinge edge and the second hinge edge, said molding including a molding material, the molding material being different from both the first and second panel materials, and wherein the molding material is a thermoplastic elastomer.

35. The binder of claim 34, wherein the molding material had a first hardness and one of the first and second panel materials has a second hardness, and wherein the first hardness is less hard than the second hardness.

36. The binder of claim 34, wherein said molding is the only connection between said first and second panels.

37. The binder of claim 34, wherein said molding is overmolded onto the at least one of said first and second panels.

38. The binder of claim 34, wherein said molding is comolded with the at least one of said first and second panels.

39. The binder of claim 34, wherein said molding allows said first panel to rotate relative to said second panel.

40. A binder comprising:
a first panel including a first panel material, a second panel including a second panel material, and a third panel that is positioned between said first and said second panel; and
a molding connecting a first hinge edge of said first panel to a second hinge edge of said second panel, said molding having a first portion attached to the first hinge edge, a second portion attached to the second hinge edge, and a joining portion which extends between the first hinge edge and the second hinge edge, said molding including a molding material, the molding material being different from both the first and second panel materials.

41. The binder of claim 40, wherein said molding is located along the entire length of the first and second hinge edge.

42. The binder of claim 40, wherein said molding is located in discrete sections spaced from one another along the first and second hinge edge.

43. The binder of claim 40, wherein said first panel is formed discretely from said second panel.

44. The binder of claim 40, wherein the molding material had a first hardness and one of the first and second panel materials has a second hardness, and wherein the first hardness is less hard than the second hardness.

45. The binder of claim 40, wherein said molding is overmolded onto the at least one of said first and second panels.

46. The binder of claim 40, wherein said molding is comolded with the at least one of said first and second panels.

47. The binder of claim 40, wherein said molding is comprises a thermoplastic elastomer.

48. The binder of claim 40, wherein each of said first and second panels is formed of polypropylene.

49. The binder of claim 40, wherein the first panel comprises a cover panel and wherein the second panel comprises a spine panel.

* * * * *